(12) United States Patent
Taira et al.

(10) Patent No.: US 7,451,785 B2
(45) Date of Patent: Nov. 18, 2008

(54) FLEXIBLE TUBE

(75) Inventors: Masao Taira, Hiroshima (JP);
Michisada Kumasaki, Hiroshima (JP)

(73) Assignee: Hirotec Corporation, Hiroshima (JP)

( * ) Notice: Subject to any disclaimer, the term of this patent is extended or adjusted under 35 U.S.C. 154(b) by 564 days.

(21) Appl. No.: 10/540,005

(22) PCT Filed: Dec. 25, 2003

(86) PCT No.: PCT/JP03/16668

§ 371 (c)(1),
(2), (4) Date: Jun. 21, 2005

(87) PCT Pub. No.: WO2004/059140

PCT Pub. Date: Jul. 15, 2004

(65) Prior Publication Data

US 2006/0081302 A1      Apr. 20, 2006

(30) Foreign Application Priority Data

Dec. 26, 2002  (JP) .............................. 2002-376417

(51) Int. Cl.
*F16L 11/00*   (2006.01)
*F16L 27/00*   (2006.01)

(52) U.S. Cl. ..................... 138/118; 138/119; 138/120; 138/148; 285/300; 285/145.5; 285/145.4; 285/903

(58) Field of Classification Search ................. 138/118, 138/114, 121, 122, 120, 148; 285/299–301, 285/144.1, 145.5, 145.1, 145.2, 903
See application file for complete search history.

(56) References Cited

U.S. PATENT DOCUMENTS

| 2,204,294 | A | * | 6/1940 | Blanchard | 261/159 |
|---|---|---|---|---|---|
| 2,451,252 | A | * | 10/1948 | Stoeckly | 285/100 |
| 3,837,364 | A | * | 9/1974 | Jenner | 464/175 |
| 4,086,665 | A | * | 5/1978 | Poirier | 623/1.44 |
| 4,415,185 | A | * | 11/1983 | Vinciguerra et al. | 285/114 |
| 5,145,215 | A | * | 9/1992 | Udell | 285/49 |

(Continued)

FOREIGN PATENT DOCUMENTS

JP          6-34127       5/1994

(Continued)

*Primary Examiner*—Patrick F Brinson
(74) *Attorney, Agent, or Firm*—Berenato, White & Stavish

(57) ABSTRACT

A flexible tube 10 of the present invention is disposed downstream of a exhaust path from an engine E, and formed of an outer bellows 3 as an outer tube and an inner bellows 4 as an inner tube; pleats 4c,4c of the inner bellows 4 are smaller in depth and pitch than the pleats 3c of the outer bellows 3, and the buffering space S is provided with a gap t between the pleats bottoms of the outer bellows 3 and the pleats tops of the inner bellows 4, and further, a partition 17 that splits the exhaust path is disposed in the inner bellows 4. For this reason, sound insulation effect is improved, and the lowering of the temperature of the exhaust gas is suppressed, leading to quick temperature rise of the exhaust gas to be fed into the catalytic converter, thereby promoting the activation of the catalysts and improving the capability to purify exhaust gas, and the exhaust efficiency can be improved thereby increasing output performance of the engine.

25 Claims, 9 Drawing Sheets

U.S. PATENT DOCUMENTS

| | | | | |
|---|---|---|---|---|
| 5,340,165 A | * | 8/1994 | Sheppard | 285/226 |
| 5,600,752 A | * | 2/1997 | Lopatinsky | 392/488 |
| 5,769,464 A | * | 6/1998 | DeBlasi et al. | 285/226 |
| 5,829,483 A | * | 11/1998 | Tukahara et al. | 138/109 |
| 5,983,950 A | * | 11/1999 | Aoki et al. | 138/109 |
| 6,062,268 A | * | 5/2000 | Elsasser et al. | 138/121 |
| 6,848,478 B2 | * | 2/2005 | Nagai | 138/112 |

FOREIGN PATENT DOCUMENTS

| | | |
|---|---|---|
| JP | 6-336921 | 6/1994 |
| JP | 8-277711 | 10/1996 |
| JP | 9-268913 | 10/1997 |
| JP | 11-257070 | 9/1999 |

\* cited by examiner (a)

(b)

(c)

(d)

(a)

(b)

(c)

(a)

(b)

(c)

(d)

(a)

(b)

(c)

(d)

FLEXIBLE TUBE

TECHNICAL FIELD

The present invention relates to a flexible tube to be provided in an exhaust system for an engine.

BACKGROUND ART

An exhaust system for releasing exhaust gas from an automobile engine to the outside environment is explained below. FIG. 8(a) shows a cutaway perspective view of an exhaust system connected to an engine of a conventional or existing automobile.

As shown in FIG. 8(a), an exhaust system A includes: an exhaust manifold M1 for collecting exhaust gas from cylinders of an engine E; a flexible tube P1 connected to the exhaust manifold M1; a catalytic converter C for purifying toxic components in the exhaust gas by oxidation with catalysts; a center pipe P2; a muffler M3 for attenuating the throbbing of the engine E utilizing the principles of sequential expansion of the exhaust gas, resonance, interference and absorbance of sonic waves, cooling of the gas and the like; and a tail pipe P3. Depending on types of automobiles, a sub muffler M2 (not shown) may be additionally disposed upstream of the muffler M3.

FIG. 8(b) shows a schematic diagram of (a), and FIG. 8(c) is a diagram in which the flexible tube P1 is placed downstream of the catalytic converter C.

As for conventional flexible tubes, those disclosed in patent documents have been known (for example, see Japanese Kokai unexamined patent publication No. 9-268913). FIG. 9 shows a half sectional view of a conventional flexible tube. As shown in FIG. 9, a flexible tube 80 is disposed between the engine E and the catalytic converter C on the exhaust path from the engine E. The flexible tube 80 includes: an end pipe 82 which is an inlet to be connected to the exhaust path from the engine E; an end pipe 83 which is an outlet to be connected to the catalytic converter C: a bellows-shaped tube main body 84 made of metal; and a heat guard tube 85.

Both end parts of the tube main body 84 are fit onto the respective end pipes 82 and 83, and welded to the end pipes 82 and 83, together with the corresponding pipe sleeves 86 held on the outer periphery of the end parts of the tube main body 84. Each of the end pipes 82 and 83 has steps so that the part of the end pipe closer to a middle section of the flexible tube has a smaller diameter. Inside the tube main body 84, a heat guard tube 85 is provided in such a manner that it spans the space between the inner end parts of the pipes 82 and 83.

The heat guard tube 85 is formed of cylindrical cloth woven out of carbon fiber, and flexible fiber material is used in order to lessen the harmful effect of heat on the tube main body 84, to attenuate noise and to reduce heat.

However, this fiber cloth has a problem in that high-temperature exhaust gas easily leaks out through space left between the fibers and reaches the outer bellows, having harmful effects on durability, spring property and the like of the outer bellows.

In addition, exhaust sound also passes through space left between the fibers, reaches the outer bellows, and then leaks out from the flexible tube 80, thus increasing exhaust noise.

In the case where the flexible tube 80 is located upstream of the catalytic converter C, exhaust gas of high temperature directly reaches the outer bellows through space left between the fibers. Therefore, during the initial period of engine start-up, the temperature of the exhaust gas becomes lower and the temperature rise of the exhaust gas to be fed into the catalytic converter C takes longer, resulting in poor performance capability to purify the exhaust gas.

It should be noted that the flexible tube P1 according to the conventional art corresponds to what is called an exhaust pipe.

Accordingly, the present invention was made with the view toward solving the above-mentioned problem, and an object thereof is to provide a flexible tube disposed downstream of the exhaust path from the engine, which may have the following advantages: sound insulation effect is improved; the exhaust efficiency is improved to thereby increase the output performance of the engine; the exhaust gas temperature reaching the outer bellows are suppressed to thereby improve durability of the flexible tube itself; and especially in the case of the flexible tube disposed upstream of the catalytic converter, the lowering of the exhaust gas temperature is prevented to thereby speed up the temperature rise of the exhaust gas to be fed into the catalytic converter, so as to promote the activation of the catalysts and improve the capability to purify the exhaust gas.

DISCLOSURE OF INVENTION

The flexible tube according to a first aspect of the present invention is a flexible tube to be disposed on an exhaust path for exhaust gas from an engine, the tube including an outer bellows that is an outer tube having a flexible part with bellows, and an inner bellows that is an inner tube having a flexible part with bellows, the inner tube being fixed to one open end part of the outer bellows, wherein a gap as a buffering space is provided between bottoms of the pleats of the outer bellows and tops of the pleats of the inner bellows.

According to the first aspect of the invention, by providing a gap as a buffering space between bottoms of the pleats of the outer bellows and tops of the pleats of the inner bellows, the amounts of exhaust noise and heat released from the inner bellows are suppressed by the buffering space, thus durability of the outer bellows is improved, and the amounts of exhaust sound and heat released from the outer bellows can be reduced. In addition, in a case of a flexible tube disposed upstream of the catalytic converter, the lowering of the temperature of the exhaust gas to be fed into the catalytic converter is suppressed, leading to quick temperature rise of the exhaust gas to be fed into the catalytic converter, thus resulting in improved capability to purify exhaust gas.

A second aspect of the invention is a flexible tube according to the first aspect, wherein an overlapping space is provided where the inner bellows and an auxiliary pipe overlap each other, the inner bellows being fixed to an exhaust gas inlet of the outer bellows and extending toward an exhaust gas outlet thereof, the auxiliary pipe being fixed to the exhaust gas outlet of the outer bellows and extending toward the exhaust gas inlet; and an interference prevention member is held in the overlapping space.

According to the second aspect of the invention, by holding the interference prevention member in the overlapping space between the inner bellows and the auxiliary pipe, the interference between the outer bellows and the inner bellows is avoided, the vibration of the outer bellows is absorbed, the stress in the inner bellows caused by heat is resolved, and thus durability of the inner bellows is improved.

A thrid aspect of the invention is a flexible tube according to the second aspect of the invention wherein the interference prevention member is positioned utilizing a plurality of protrusions formed in the overlapping space for determining a longitudinal position thereof.

According to the the thrid aspect of the invention, by holding the interference prevention member between the protrusion formed on the outer periphery of the inner bellows and the protrusion formed on the inner periphery of the auxiliary pipe, the longitudinal position is guided. Alternatively, the longitudinal positioning of the interference prevention member is guided by holding the interference prevention member between two protrusions formed on the inner bellows, or two protrusions formed on the auxiliary pipe.

The invention according to a fourth aspect is a flexible tube according to the second aspect wherein the interference prevention member is made of mesh wire.

According to the fourth aspect of the invention, by making the interference prevention member of mesh wire, sound insulation effect is improved, the difference in expansion between the outer bellows and the inner bellows caused by high temperature is easily absorbed and the generation of stress is suppressed, leading to improvement in durability and absorption of the vibration.

The invention according to a fifth aspect is a flexible tube according to the first aspect wherein the pleats of the inner bellows are smaller in depth and pitch than those of the outer bellows.

According to the fifth aspect of the invention, by configuring a double structure tube with the pleats of the bellows of the inner bellows being smaller in depth and pitch than those of the outer bellows, the flexible tube becomes compact with a high packing degree. Moreover, since the flexibility is fully maintained and turbulence in the exhaust gas is suppressed, the loss of the flow is reduced, leading to the improvement in the flow efficiency and thus in the output of the engine.

The invention according to a sixth aspect is a flexible tube according to the first aspect wherein an overlapping space is provided where the outer bellows and the inner bellows overlap each other, the outer bellows being fixed to an outlet of the exhaust gas from the engine and the inner bellows extending toward an exhaust gas outlet, and an interference prevention member is held in the above-mentioned overlapping space.

According to the sixth aspect of the invention, by providing the overlapping space where the outer bellows and the inner bellows overlap each other, no auxiliary pipe is necessary and the structure becomes simple, and therefore the loss of the flow is reduced, leading to the improvement in the flow efficiency and the increase in the output of the engine, not to mention the reduction in cost.

The invention according to a seventh aspect is a flexible tube according to the sixth aspect wherein the interference prevention member held in the overlapping space has a nearly circular cross section.

According to the seventh aspect of the invention, by making the cross section of the interference prevention member a nearly circle, sound insulation effect is improved, the exhaust efficiency is improved, and thus the output performance of the engine is increased. In addition, durability against free bend, shear and the like is improved. Moreover, the temperature of the exhaust gas reaching the outer bellows, which is generally high, is suppressed, leading to the improvement in durability of the flexible tube.

The invention according to an eight aspect is a flexible tube according to the first aspect wherein an overlapping space is provided where the inner bellows and an auxiliary pipe overlap each other, the inner bellows being fixed to the exhaust gas inlet of the outer bellows and extending toward the exhaust gas outlet, and the auxiliary pipe being fixed to the outlet of the outer bellows and extending toward the inlet, and the inner bellows and the auxiliary pipe in the overlapping space are disposed with a gap therebetween that allows them to slidably move relative to each other.

According to the eighth aspect of the invention, by disposing the auxiliary pipe and the inner bellows with a gap therebetween that allows them to slidably move relative to each other, the difference in expansion between the outer bellows and the inner bellows caused by high temperature is easily absorbed, and the generation of stress is suppressed. In addition, the temperature of the exhaust gas reaching the outer bellows, which is generally high, is suppressed, leading to the improvement in durability of the flexible tube.

The invention according to a ninth aspect is a flexible tube according to the first or second aspect wherein the overlapping space is rotatably and slidably configured to have an interference prevention member provided between an auxiliary pipe and an outer periphery of the other end part of the inner bellows, in such a manner that permits the interference prevention member to slide in axial directions; and wherein the interference prevention member includes an outer spherical surface having a radius R with a center thereof aligned on an axis of the inner bellows, and the outer spherical surface overlaps and rotatably engages with an inner spherical surface provided in the auxiliary pipe, the inner spherical surface having a radius R with a center thereof aligned on the axis of the inner bellows.

According to the ninth aspect of the invention, by providing a rotatable overlapping space by providing the outer spherical surface (also referred to as "male form") having a radius R with the center thereof aligned on the axis of the inner bellows and the inner spherical surface (also referred to as "female form") of the auxiliary pipe, durability against tensile, compression, free bend, shear and the like is remarkably improved, leading to the flexible tube with prolonged life.

The invention according to a tenth aspect is a flexible tube according to any one of second, sixth, and seventh aspects wherein the inner bellows is separated into a plurality of pieces; on one end part of each piece, an outer spherical surface is provided so as to have a radius R with the center thereof aligned on the axis of the inner bellows; on the other end part of the adjacent inner bellows piece, an inner spherical surface is provided so as to have a radius R with the center thereof aligned on the axis of the inner bellows; and the outer spherical surface and inner spherical surface pivotally support each other to provide a spherical joint that can rotatably slide.

According to the tenth aspect of the invention, by separating the inner bellows into a plurality of pieces and by providing a rotatable and slidable spherical joint formed of the outer spherical surface and the inner spherical surface on the end parts of the pieces, durability against to free bend and shear is remarkably improved, leading to the flexible tube with prolonged life.

The term "inner bellows" means an inner tube on which bellows having stretchability, airtightness and spring property is formed, and those having only one pleat and having the form of outer spherical surface (male form) or inner spherical surface (female form) of a spherical joint are also referred to as "inner bellows".

The invention according to an eleventh aspect is a flexible tube according to the ninth aspect wherein the inner bellows is separated into a plurality of pieces; on one end part of each piece, an outer spherical surface is provided so as to have a radius R with the center thereof aligned on the axis of the inner bellows; on the other end part of the adjacent inner bellows piece, an inner spherical surface is provided so as to have a radius R with the center thereof aligned on the axis of the inner bellows; and the outer spherical surface and inner spherical surface pivotally support each other to provide a spherical joint that can rotatably slide.

According to the eleventh aspect of the invention, by separating the inner bellows into a plurality of pieces and by providing a plurality of rotatable and slidable spherical joints each formed of the outer spherical surface of the interference prevention member and the inner spherical surface, durability against free bend and shear is remarkably improved, leading to the flexible tube with prolonged life.

The invention according to a twelfth aspect is a flexible tube according to the tenth aspect wherein a ring-shaped interference prevention member is held on the outer periphery of the inner bellows; on the outer periphery of the interference prevention member, an outer spherical surface is provided so as to have a radius R with the center thereof aligned on the axis of the inner bellows; on the other end part of the adjacent inner bellows, an inner spherical surface is provided so as to have a radius R with the center thereof aligned on the axis of the inner bellows; and the outer spherical surface of the interference prevention member and the inner spherical surface of the inner bellows pivotally support each other to provide a spherical joint that can rotatably slide.

According to the twelfth aspect of the invention, by providing the outer spherical surface having a radius R on the outer periphery of the ring-shaped interference prevention member, and by providing a rotatable and slidable spherical joint formed of the interference prevention member held by one end part of the inner bellows and the inner spherical surface on the other end part of the adjacent inner bellows, sound insulation effect of the interference prevention member is improved, the generation of stress in the outer bellows and the inner bellows at high temperature is suppressed, the vibration is absorbed, and durability against free bend, shear and the like is remarkably improved, leading to amplified effects and the flexible tube with prolonged life.

The invention according to a thirteenth aspect is a flexible tube according to the twelfth aspect wherein a plurality of the spherical joints is provided on the inner bellows.

According to the thirteenth aspect of the invention, by providing a plurality of the spherical joints on the inner bellows, the generation of the stress is suppressed, the vibration is absorbed, and durability against free bend, shear and the like is remarkably improved.

The invention according to a fourteenth aspect is a flexible tube according to the tenth aspect wherein a plurality of the spherical joints is provided on the inner bellows.

According to the fourteenth aspect of the invention, by providing a plurality of the spherical joints on the inner bellows, the generation of the stress is suppressed, the vibration is absorbed, and durability against free bend, shear and the like is remarkably improved.

The invention according to a fifteenth aspect is a flexible tube according to the first aspect wherein a partition is disposed that splits the exhaust path in a direction from the exhaust gas inlet to the exhaust gas outlet.

According to the fifteenth aspect of the invention, by providing a flexible part on a partition that splits the exhaust path of the inner bellows, the partition steady and flexibly accommodates the displacement of the inner bellows.

The invention according to a sixteenth aspect is a flexible tube according to the fifteenth aspect wherein the partition has adhesive surfaces for attaching to the inner periphery of the inner bellows, and has a flexible part for allowing the partition to freely displace.

According to the sixteenth aspect of the invention, by providing the partition with a flexible part for allowing the partisan to freely displace, which flexible part includes bellows in the form of plate formed of steel plate having spring property, free displacement of the main body of the inner bellows is allowed.

The invention according to a seventeenth aspect is a flexible tube according to the sixteenth aspect wherein the flexible part for allowing the partition to freely displace includes bellows in the form of plate formed of steel plate having spring property.

According to the seventeenth aspect of the invention, by providing bellows in the form of plate formed of steel plate having spring property, turbulence in the exhaust gas is suppressed, the loss of the flow is reduced, leading to the improvement in the flow efficiency and thus in the output of the engine.

The invention according to an eighteenth aspect is a flexible tube according to the sixteenth aspect wherein the flexible part for allowing the partition to freely displace includes a plurality of steel plates having spring property, one end part thereof being fixed to the partition on the inlet side in such a manner that the partition is clamped by the steel plates, and the other end part thereof holding the partition on the outlet side in such a manner that the partition is clamped by the steel plates.

According to the eighteenth aspect of the invention, instead of by providing a bellows in the form of a plate, by providing the flexible part including two steel plates having spring property, one end part thereof being fixed to the partition on the inlet side in such a manner that the partition is clamped by the two steel plates, and the other end part thereof holding the partition on the outlet side in such a manner that the partition is clamped by the two steel plates, expensive bellows is not necessary, and an inexpensive flexible part can be introduced easily. Moreover, as compared with the flexible tube having a flexible part with bellows, turbulence in the exhaust gas is suppressed and the loss of the flow is reduced, leading to the improvement in the flow efficiency and thus in the output of the engine.

BEST MODE FOR CARRYING OUT THE INVENTION

Figure 1:
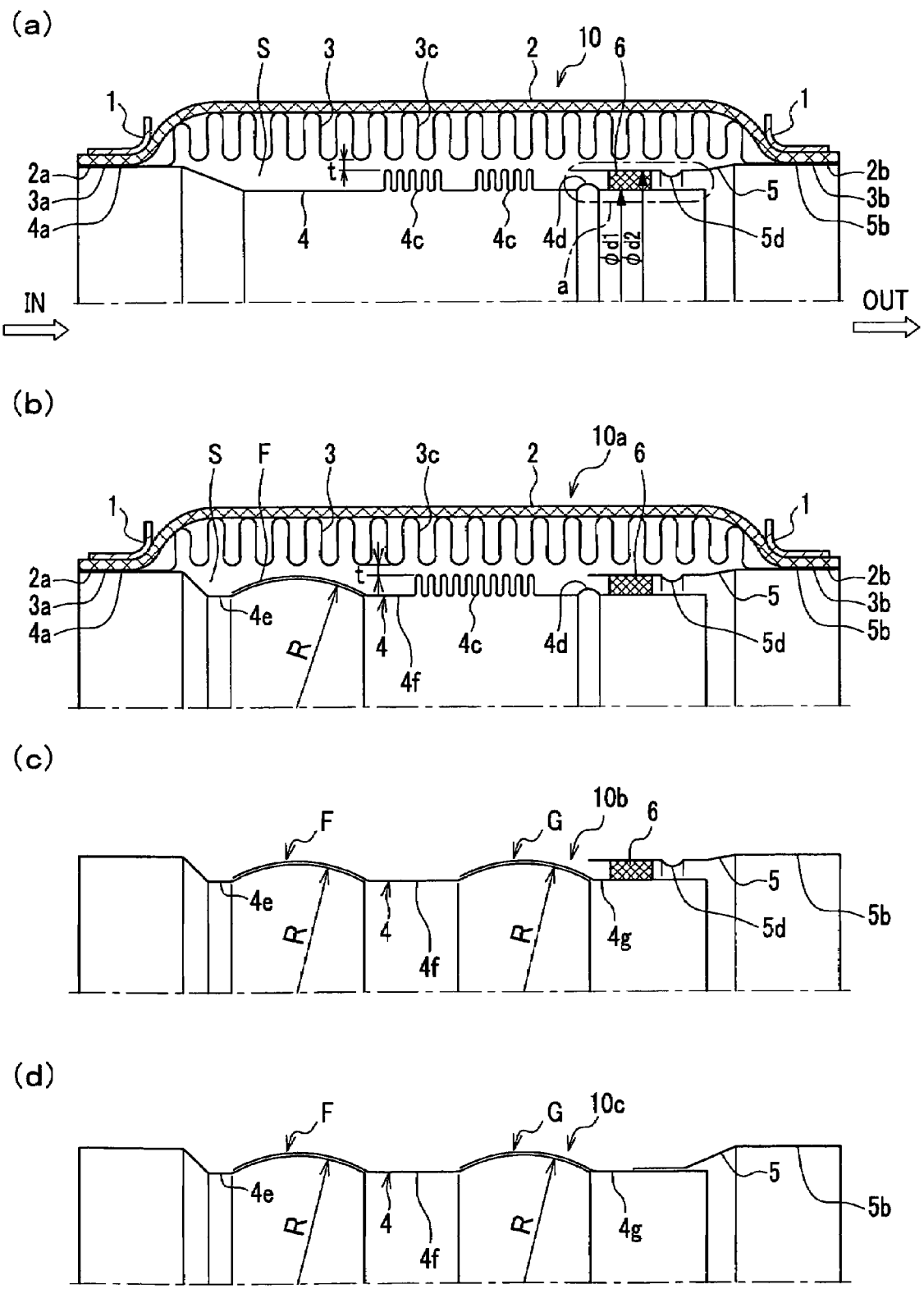
In FIG. 1, (a) shows a half sectional view of the flexible tube according to a first embodiment of the present invention. (b) shows a half sectional view of the flexible tube according to a second embodiment of the present invention. (c) shows a half sectional view of the flexible tube according to a third embodiment of the present invention. (d) shows a half sectional view of the flexible tube according to a fourth embodiment of the present invention.

The mode for carrying out the present invention will be described in detail below with reference to the accompanying drawings.

FIRST EMBODIMENT

FIG. 1(a) shows a half sectional view of a flexible tube according to a first embodiment of the present invention. As shown in FIG. 1(a), the flexible tube 10 includes protectors 1,1, an outer blade 2, an outer bellows 3, an inner bellows 4, an auxiliary pipe 5 and an interference prevention member 6. A buffering space S is provided with a gap t between the pleats bottoms (inner diameter) of the outer bellows and the pleats tops (outer diameter) of the inner bellows. The flexible tube 10 has, for example, a diameter of φ90 mm at the thickest portion and the overall length of approximately 200 mm.

The protectors 1 are provided on both end parts of the flexible tube 10. The cross section of the protector 1 is nearly L-shaped. On the inner periphery of the protector 1, the end part of the outer blade 2 is fixedly installed, in such a manner that the elevation part of the outer blade 2 is protected.

The outer blade 2 is formed of thread of SUS 304 alternately woven, and the thread diameter of the blade is φ0.4 mm. The blade is formed so that it fits to the shape of the outer bellows 3 having smaller diameters at both end parts, and both end parts are fixed to the inner periphery of the protectors 1,1.

The outer bellows 3 is formed of SUS 304, and the thickness of the plate is preferably 0.3 mm. The outer bellows 3 includes a bellows (also called pleats) 3c and cylindrical parts 3a and 3b at both end parts, and the pleats 3c are protected by the outer blade 2 located on the outer periphery of the pleats 3c.

The inner bellows 4 is made of SUS 316, which is a steel plate having higher corrosion resistance to oxidation at high temperatures, as compared with that made of SUS 304. The thickness is preferably 0.3 mm. On the exhaust gas inlet IN (left side in the figure), a cylindrical part 4a is provided, and the inner bellows is partially tapered in such a manner that the gap t is provided between the inner bellows and the outer bellows 3. The flexible part of the inner bellows 4 has pleats 4c,4c which are smaller in depth and pitch than those of the outer bellows 3.

The auxiliary pipe 5 has a cylindrical part 5b provided on the exhaust gas outlet OUT side (right side in the figure), and the pipe is partially tapered in such a manner that a cylindrical auxiliary pipe 5 is located outside of the inner bellows 4, i.e., between the outer bellows 3 and the inner bellows 4, and an overlapping space a is provided where the inner bellows 4 and the auxiliary pipe 5 overlap each other with a certain gap. The axial length of the overlapping space a is preferably from 30 to 50 mm.

To the ring-shaped space created by the difference in size between the inner diameter φd1 and the outer diameter φd2 in the overlapping space a, an interference prevention member 6 is fitted. The longitudinal position of the interference prevention member 6 is guided by two protrusions 4d and 5d. The protrusion 4d is formed in the vicinity of the right end part of the outer periphery of the inner bellows 4. The protrusion 5d is formed in the vicinity of the left end part of the inner periphery of the auxiliary pipe 5. These two serves to position the interference prevention member.

The configuration of the protrusions can be those shown in FIGS. 3(a) and 3(b) which will be described below.

The interference prevention member 6 is made of mesh wire. The mesh wire is a ring-shaped or C-shaped article made by laminating layers each formed by continuously weaving a metal thread. Such a structure provides the article with excellent durability and elasticity, as well as remarkable effects in shock absorption, vibration isolation, noise attenuation, heat exchange, filtration, thermal storage and the like. The distance between two protrusions 4d and 5d is set larger to some extent than the width of the interference prevention member 6 so as to allow the interference prevention member 6 to slide axially or rotate. As a result, kinetic energy due to the vibration or noise is converted into inertial energy and frictional heat and consumed as frictional heat, leading to attenuation of the vibration and noise.

In order to dispose the interference prevention member 6 to the predetermined position, it will suffice to install the member 6 on the inner bellows or the auxiliary pipe prior to providing the overlapping space.

On the right end part of the inner bellows 4, the interference prevention member 6 is provided, and on the both sides of the member 6, the protrusions 4d and 5d are formed. With this structure, the gap t is secured between the pleats bottoms of the outer bellows 3 and the pleats top of the inner bellows 4, which creates the nearly cylindrical space as a buffering space S with the gap t.

As a result of this double structure, sound insulation effect is improved, and the heat of the exhaust gas is maintained, and thus the lowering of the temperature is suppressed, leading to quick temperature rise of the exhaust gas to be fed into the catalytic converter, thereby promoting the activation of the catalysts and the purification of the exhaust gas components.

Now, the operation and effect of the first embodiment are explained.

Figure 8:
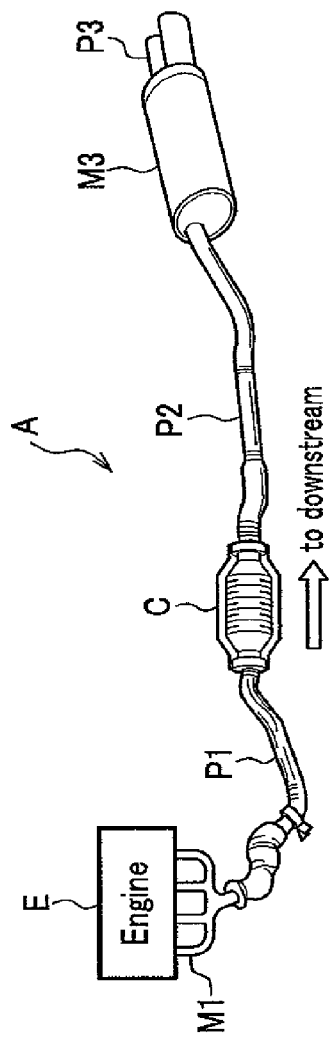
In FIG. 8, (a) shows a partially cutaway perspective view of an exhaust system connected to an engine of a conventional or existing automobile, (b) shows a schematic diagram of (a), and (c) shows a diagram in which the flexible tube is disposed downstream of the catalytic converter C.
Figure 8:
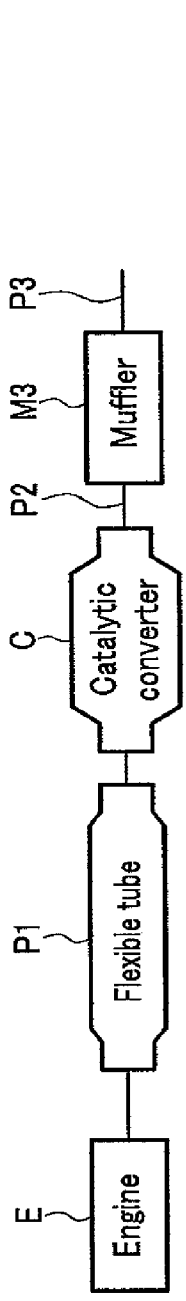
Figure 8:
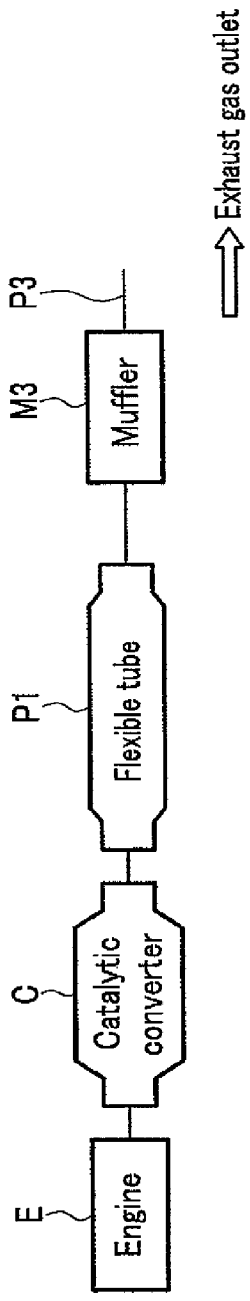
Figure 9:
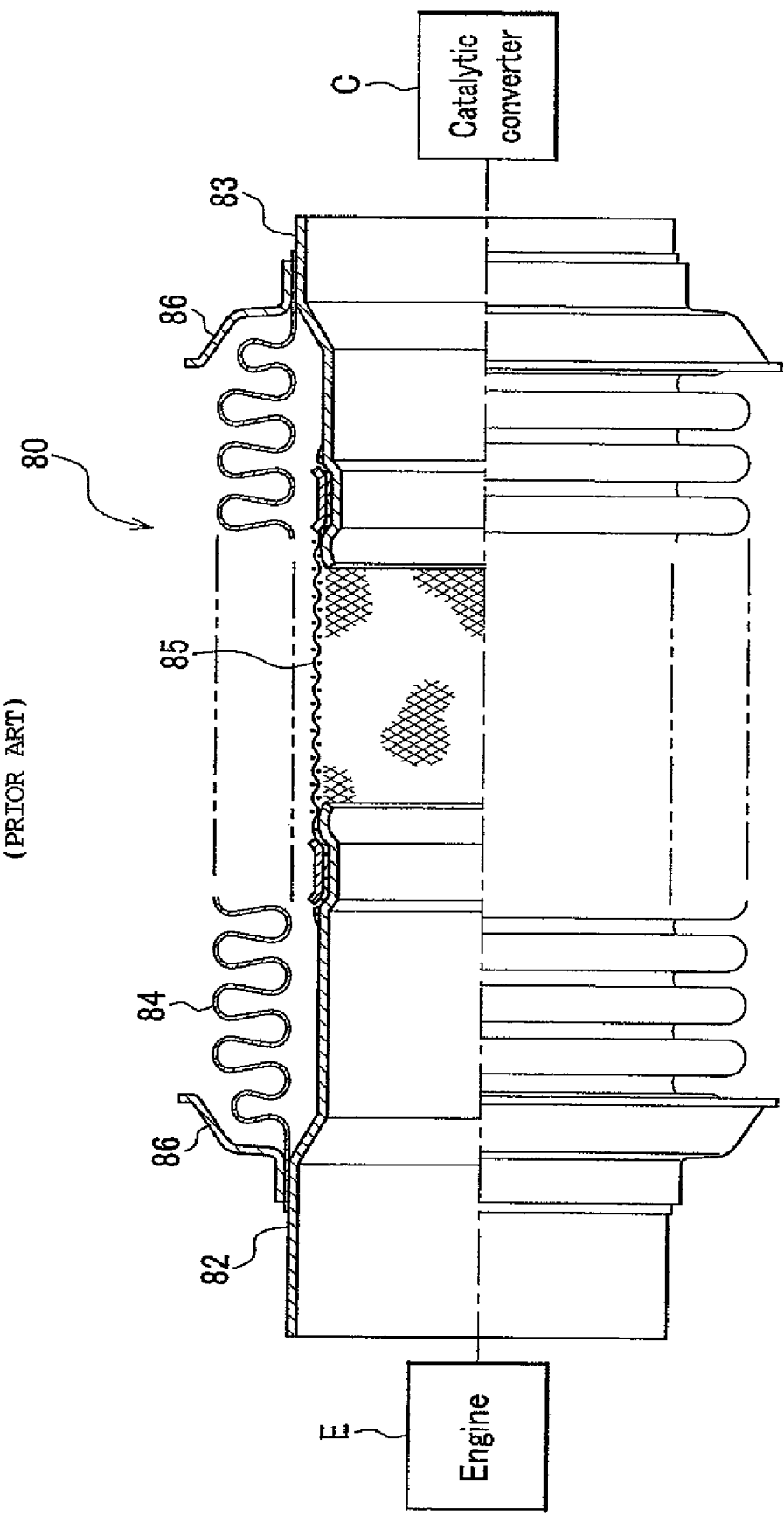
FIG. 9 shows a half sectional view of a conventional flexible tube.

For example, as shown in FIGS. 8(a) and (b), the upstream (left end in the figure) of the flexible tube 10 is connected to the exhaust manifold M1 and the downstream (right end in the figure) is connected to the catalytic converter C. The buffering space S with the gap t relative to the inner diameter of the outer bellows 3 (see FIG. 1(a)) is also provided around the overlapping space a in which the inner bellows 4 and the auxiliary pipe 5 overlap each other. In the overlapping space a, the inner bellows 4 and the auxiliary pipe 5 overlap each other with the sufficient gap in the radial direction and with the sufficient length in the axial direction, and the interference prevention member 6 is held on to fit the gap provided in the overlapping space a. The longitudinal position of the interference prevention member 6 is guided by means of one protrusion 4d formed in the right end part of the inner bellows 4 on the outer periphery and one protrusion 5d formed in the right end part of the auxiliary pipe 5 on the inner periphery.

The exhaust gas from the cylinders of the engine E is collected through the exhaust manifold M1 as one flux, and passes through the inner tube of the flexible tube 10. At this time, sound insulation effect is obtained by the double structure configured by the outer bellows 3 and the inner bellows 4 with the auxiliary pipe 5. In addition, excellent thermal effect is also obtained and thus the lowering of the temperature is suppressed, leading to quick temperature rise of the exhaust gas to be fed into the catalytic converter C, thereby promoting the activation of the catalysts and the purification of the exhaust gas components. Further, the presence of the interference prevention member 6 prevents the outer bellows 3 and the inner bellows 4 from interfering with each other. Because the interference prevention member 6 is allowed to rotate or slide, kinetic energy due to the vibration or noise is converted into inertial energy and frictional heat and consumed as frictional heat, leading to attenuation of the vibration and noise.

SECOND EMBODIMENT

FIG. 1(b) shows a half sectional view of a flexible tube according to a second embodiment of the present invention. As shown in FIG. 1(b), a flexible tube 10a includes protectors 1,1, an outer blade 2, an outer bellows 3, an inner bellows 4, an auxiliary pipe 5 and an interference prevention member 6. The inner bellows 4 is separated into two pieces, inner bellows 4e and 4f.

On the right end part of the inner bellows 4e, a spherical surface is provided whose convex outer periphery having a radius R with its center aligned on the axis of the inner bellows can rotatably slide (hereinbelow, this spherical surface is referred to as "outer spherical surface"). On the left end part of the inner bellows 4f, a spherical surface is provided whose convex inner periphery having a radius R with its center aligned on the axis of the inner bellows can rotatably slide (hereinbelow, this spherical surface is referred to as "inner spherical surface"). The outer spherical surface and the inner spherical surface engage and pivotally support each other to provide a spherical joint F that can rotatably slide. Other components, which are the same as those illustrated in FIG. 1(a), are designated with the same reference characters, and thus a duplicate description is omitted.

In short, the term "outer spherical surface" means a spherical surface whose convex outer periphery having a radius R can rotatably slide, and the term "inner spherical surface" means a spherical surface whose convex inner periphery having a radius R can rotatably slide. The part where the outer spherical surface and the inner spherical surface are rotatably and slidably engaged is referred to as "spherical joint," hereinbelow.

It should be noted that the radius R of the outer periphery of the outer spherical surface and the radius R of the inner periphery of the inner spherical surface is naturally different in size by the amount of gap corresponding to the dimensional tolerance.

As explained above, by providing the spherical joint F on the inner bellows 4, durability against free bend, shear and the like is remarkably improved, leading to the flexible tube with prolonged life.

THIRD EMBODIMENT

FIG. 1(c) shows a half sectional view of a flexible tube 10b according to a third embodiment of the present invention. In FIG. 1(c), the protectors 1,1, the outer blade 2 and the outer bellows 3 are omitted, but in practice, the tube has a structure similar to that shown in FIG. 1(b). In this third embodiment, another spherical joint G is provided, in addition to the above-mentioned spherical joint F shown in FIG. 1(b). Here, the spherical joint G is explained.

The inner bellows 4 is separated into three pieces, inner bellows 4e, 4f and 4g. Referring to the spherical joint G, an outer spherical surface (male form) is provided on the right end part of the inner bellows 4f, and the inner spherical surface (female form) is provided on the left end part of the inner bellows 4g. In addition, the outer spherical surface and the inner spherical surface engage and pivotally support each other to provide a spherical joint G that can rotatably slide. Other components, which are the same as those illustrated in FIG. 1(b), are designated with the same reference characters, and thus a duplicate description is omitted.

On the inner bellows 4f between the spherical joint F and the spherical joint G, pleats 4c may be provided.

It should be noted that, the term "inner bellows" means an inner tube in the shape of bellows, however in this description, an inner tube having at least one spherical joint is also referred to as "inner bellows".

As mentioned above, by providing the spherical joint F and the spherical joint G on the inner bellows 4, durability against free bend, shear and the like can be remarkably improved, leading to the flexible tube with prolonged life.

FOURTH EMBODIMENT

FIG. 1(d) shows a half sectional view of a flexible tube 10c according to a fourth embodiment of the present invention. As shown in FIG. 1(d), the protectors 1,1, the outer blade 2 and the outer bellows 3 are omitted, as in FIG. 1(c), but in practice, the tube has a similar structure to that shown in FIG. 1(b). In this fourth embodiment, the spherical joints F, G, which are the same as those illustrated FIG. 1(c), are designated with the same reference characters, and thus a duplicate description is omitted.

The flexible tube 10c includes the protectors 1,1, the outer blade 2, the outer bellows 3, an inner bellows 4 and an auxiliary pipe 5. This embodiment differs from FIG. 1(c) showing the third embodiment in that the interference prevention member 6 is not provided, and the inner bellows 4g is attached to the auxiliary pipe 5 but with a gap provided therebetween that allows them to slidably move relative to each other. The expression "a gap that allows them to slidably move" means that no interference prevention member is present in the overlapping space and a gap is set so that the bellows can slidably move, or a lubricant is applied to the gap to facilitate slide movement.

In addition, on the inner bellows 4f, pleats 4c may be provided.

As shown above, with respect to the inner bellows 4g, various modifications, even omission of the interference prevention member 6, are possible depending on the structure. For this reason, the weight and cost can be reduced. In addition, by providing the spherical joint F and spherical joint G that can roratably slide attained by the combination of the outer spherical surface and the inner spherical surface, durability against free bend, shear and the like can be remarkably improved, leading to the flexible tube with prolonged life.

It is preferable that a high-temperature lubricant be applied to the engagement part of the spherical joints F and G, and the sliding part between the auxiliary pipe 5 and the inner bellows 4g. The high-temperature lubricant may be a dry film lubricant for high temperature containing molybdenum, and applicable examples may include Moly Dry Spray 5510, Moly Dry 5511 (liquid form) (manufactured by Sumico Lubricant Co., Ltd), dry films, etc.

FIFTH EMBODIMENT

FIG. 2(a) shows a half sectional view of a flexible tube 20 according to a fifth embodiment of the present invention. The flexible tube 20 shown in FIG. 2(a) will now be described only with respect to the differences from FIG. 1. Those parts corresponding to the components of FIG. 1 are identified with the same reference characters. As shown in FIG. 2(a), the flexible tube 20 includes protectors 11,11, an outer blade 2, an outer bellows 13, an inner bellows 14, an auxiliary pipe 15, and an interference prevention member 16.

The protectors 11 are provided on both end parts of the flexible tube 20, and the cross section of the protector is nearly S-shaped. The outer blade 2 is protected by the protectors 11,11 and the outer periphery of the outer bellows 13 is protected by the outer blade 2.

The outer bellows 13 has pleats 13c provided thereon. The auxiliary pipe 15 is a straight pipe, while the outer diameters of the cylindrical parts 13a and 13b at both end parts are made smaller than the bottom diameter (inner diameter) of the pleats 13c in such a manner that the buffering space S between the inner bellows 14 and the outer bellows 13 is secured. The outer bellows 13 is welded or adhered to the inner periphery of the protectors 11,11 with the outer blade 2 placed therebetween.

The inner bellows 14 has a cylindrical part 14a on the inlet IN side, while the auxiliary pipe 15 has a cylindrical part 15b on the outlet OUT side, and the cylindrical parts are connected to each other via the outer blade 2 and the outer bellows 13 in such a manner that the cylindrical parts are aligned along the inner periphery of the protectors 11,11.

As shown in FIG. 2(a), the left side of the inner bellows 14 is partially tapered from the cylindrical part 14a toward the right to have a smaller diameter, creating the buffering space S between the inner bellows and the outer bellows 13. The cylindrical part 15b is provided on the outlet OUT at the right side. On the outer periphery side of the inner bellows 14, in other words, between the outer bellows 13 and the inner bellows 14, a cylindrical auxiliary pipe 15 is provided, and overlapping space a is provided where the inner bellows 14 and the auxiliary pipe 15 overlap each other.

In the overlapping space a, a ring-shaped space is provided, and to this space is fitted an interference prevention member 16 having a size that fills the difference between the inner diameter φd1 and the outer diameter φd2. The longitudinal positioning of the interference prevention member 16 is guided by one protrusion 14d formed on the outer periphery of the right end part of the inner bellows 14, and one protrusion 15a formed on the inner periphery of the right end part of the auxiliary pipe 15. The explanations for the operation are the same as those explained with respect to the first embodiment, and thus omitted.

SIXTH EMBODIMENT

FIG. 2(b) shows a half sectional view of a flexible tube 20a according to a sixth embodiment of the present invention. As shown in FIG. 2(b), the flexible tube 20a includes protectors 11,11, an outer blade 2, an outer bellows 13, an inner bellows 14 and an ( ) interference prevention member 16a. The inner bellows 14 is separated into two parts, 14e and 14f. The right end part of the inner bellows 14e and the left end part of the inner bellows 14f pivotally support each other to provide a spherical joint F that can rotatably slide. The interference prevention member 16a has a nearly circular cross section.

This embodiment is different from FIG. 2(a) showing the fifth embodiment in that the interference prevention member 16a is held without the auxiliary pipe. As shown in FIG. 2(b), a ring-shaped or C-shaped interference prevention member 16a having a nearly circular cross section is held in a recess 13d provided in the outer bellows 13, and comes into contact with the outer periphery of the inner bellows 14f. In addition, a spherical joint F is provided on the inner bellows 14. Other components, which are the same as those illustrated in FIG. 2(a), are designated with the same reference characters, and thus a duplicate description is omitted.

As mentioned above, by providing the spherical joint F that can rotatably slide on the inner bellows 14, and by holding the interference prevention member 16a having a nearly circular cross section in the recess 13d provided in the outer bellows 13, durability against tensile, compression, free bend, shear and the like is remarkably improved, leading to the flexible tube with prolonged life.

SEVENTH EMBODIMENT

FIG. 2(c) shows a half sectional view of a flexible tube 20b according to a seventh embodiment of the present invention. In FIG. 2(c), the protectors 11,11, the outer blade 2 and the outer bellows 13 are omitted, but in practice, the tube has a similar structure to that shown in FIG. 2(b). In this seventh embodiment, spherical joints Fa and Ga are provided, which have different structures from that of the spherical joint F shown in FIG. 2(b).

First, the spherical joint Fa is explained. The inner bellows 14 is separated into two pieces, inner bellows 14e and inner bellows 14f. On the cylindrical outer periphery of the inner bellows 14e, protrusions 14g and 14h are formed. The interference prevention member 16b is positioned from both sides utilizing the protrusions 14g and 14h. In addition, on the outer periphery (upper face) of the interference prevention member 16b, an outer spherical surface (male form) is provided. On the left end part of the adjacent inner bellows 14f, an inner spherical surface (female form) is provided. In combination, they provide a spherical joint Fa. In the same manner, a spherical joint Ga is provided.

Other components, which are the same as those illustrated in FIG. 2(a), are designated with the same reference characters, and thus a duplicate description is omitted. It should be noted that the inner spherical surface can be made on the inner bellows 14g, instead of on the inner bellows 14f. In addition, pleats 14c may be provided on the inner bellows 14f.

As mentioned above, by placing the interference prevention members 16b and 16c, each having the outer spherical surface, on the inner bellows 14, and by providing the spherical joint Fa and the spherical joint Ga that can rotatably slide in the longitudinal direction (shown as an arrow in the figure) on the adjacent inner bellows 14, durability against tensile, compression, free bend, shear and the like is remarkably improved, leading to the flexible tube with prolonged life.

EIGHTH EMBODIMENT

FIG. 2(d) shows a half sectional view of a flexible tube 20c according to an eighth embodiment of the present invention. In FIG. 2(d), the protectors 11,11, the outer blade 2 and the outer bellows 13 are omitted, but in practice, the tube has a similar structure to that shown in FIG. 2(b). In this eighth embodiment, spherical joints Fb and Gb are provided, which have different structures from those of the spherical joints Fa and Ga shown in FIG. 2(b), and the interference prevention member 16e is provided.

Hereinbelow, the spherical joint Fb is explained. The inner bellows 14 is separated into three pieces, 14e, 14f and 14g.

On the right end part of cylindrical part of the inner bellows 4e, a protrusion 14g is formed, and on the inner periphery of the interference prevention member 16d, a groove is formed for engaging with the protrusion 14g. Then the interference prevention member 16d is attached to the protrusion 14g. On the interference prevention member 16d, an outer spherical surface (male form) is provided. On the adjacent inner bellows 14g, an inner spherical surface (female form) is provided, and the combination thereof provides a spherical joint Fb.

In the same manner as the spherical joint Fb, a spherical joint Gb is provided on the right side.

Further, an interference prevention member 16e is provided. In order to prevent the interference prevention member 16e from being detached, on either the outer periphery or the inner periphery of the interference prevention member 16e, an adhesive is applied, and on the other periphery a high-temperature lubricant is applied.

Other components, which are the same as those illustrated in FIG. 2(c), are designated with the same reference characters, and thus a duplicate description is omitted. It should be noted that pleats 14c may be provided on the inner bellows 14f.

As mentioned above, the interference prevention member 16d can be positioned utilizing one protrusion. In addition, by providing two spherical joints on the inner bellows 14, each of which joint can rotatably slide using the interference prevention member 16d, durability against free bend, shear and the like is remarkably improved, leading to the flexible tube with prolonged life.

NINTH EMBODIMENT

Figure 2:
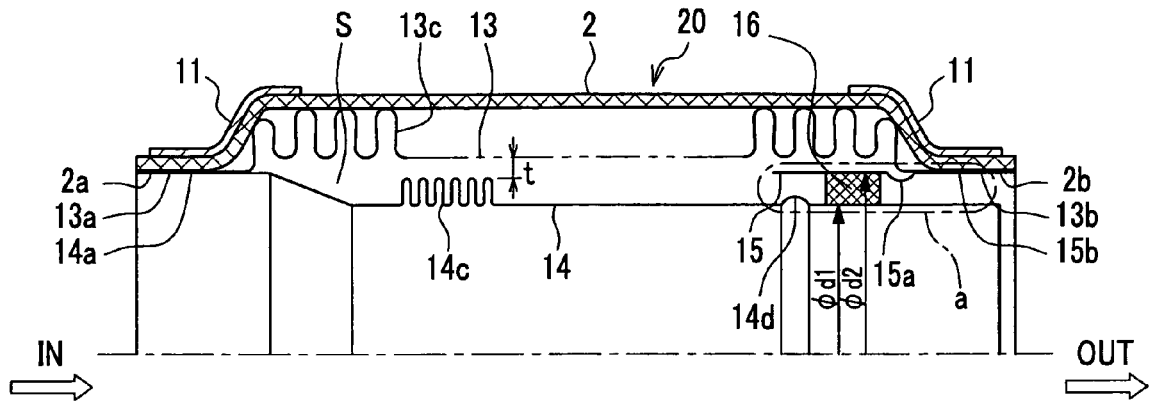
In FIG. 2, (a) shows a half sectional view of the flexible tube according to a fifth embodiment of the present invention. (b) shows a half sectional view of the flexible tube according to a sixth embodiment of the present invention. (c) shows a half sectional view of the flexible tube according to a seventh embodiment of the present invention. (d) shows a half sectional view of the flexible tube according to an eighth embodiment of the present invention.
Figure 2:
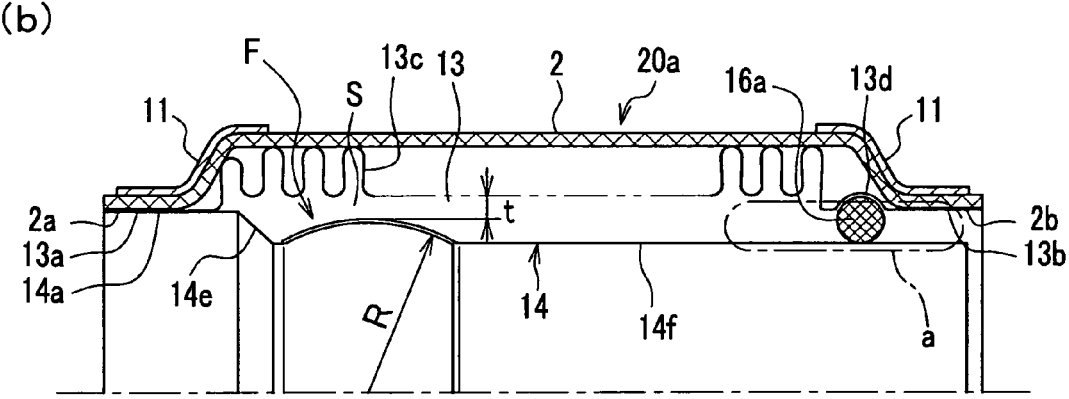
Figure 2:
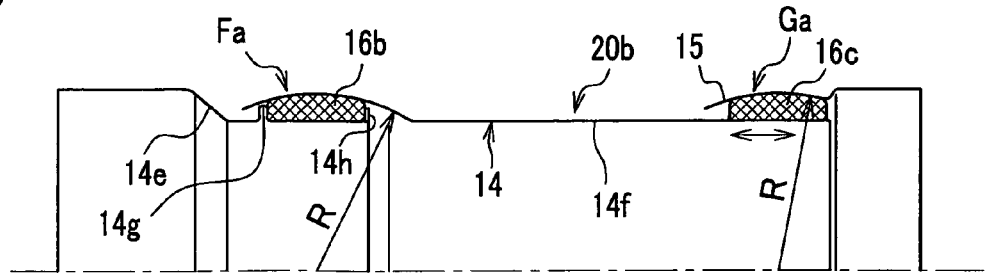
Figure 2:
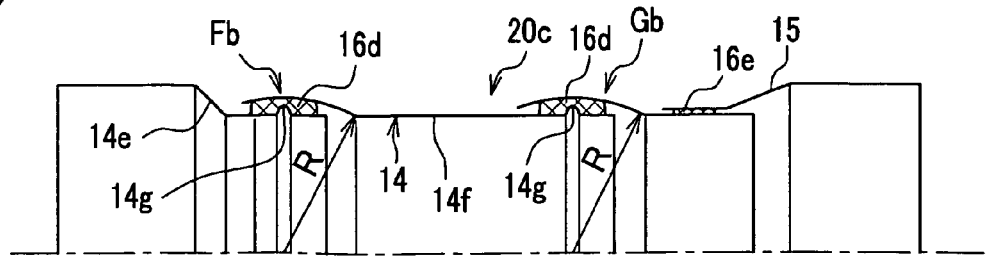

FIG. 3(a) shows a half sectional view of a flexible tube 30 according to a ninth embodiment of the present invention. The flexible tube 30 shown in FIG. 3(a) will now be described only with respect to the differences from FIG. 2. Those parts corresponding to the components of FIG. 2 are identified with the same reference characters.

As shown in FIG. 3(a), the flexible tube 30 includes protectors 11,11, an outer bellows 13, an inner bellows 14, a flanged pipe 24, an auxiliary pipe 25 and an interference prevention member 6.

This embodiment is different from the fifth embodiment shown in FIG. 2(a) in that the flanged pipe 24 at the inlet IN of the inner bellows 14 and the auxiliary pipe 25 are made of thicker plate and the part of the inner bellows 14 in the vicinity of the outlet OUT is made of thinner plate. In addition, provision of the flanged pipe 24 formed at the inlet of the inner bellows 14 makes it possible to make spanning of pleats 14c shorter.

Moreover, in the overlapping space b where the inner bellows 14 and the auxiliary pipe 25 overlap each other, the interference prevention member 6 is guided and positioned by two protrusions 14d, 14d formed on the outer periphery of the right end part of the inner bellows 14.

TENTH EMBODIMENT

FIG. 3(b) shows a half sectional view of a flexible tube 30a according to a tenth embodiment of the present invention. As shown in FIG. 3(b), the protectors 11,11, the outer blade 2 and the outer bellows 13 as in FIG. 3(a) are omitted, but in practice, the tube 30a has a similar structure to that shown in FIG. 3(a). In this tenth embodiment, a spherical joint Fc and a spherical joint Gc are provided, and pleats 14c are disposed between the spherical joint Fc and the spherical joint Gc. The interference prevention member 6 is held in the overlapping space b.

FIG. 3(d) relates to one embodiment, and shows a sectional view of a modified embodiment of the interference prevention member 6 in the overlapping space b shown in (a) and (b). As shown in FIG. 3(d), the interference prevention member 6 can be positioned utilizing two protrusions 25d, 25d on the inner periphery of the auxiliary pipe 25 in the overlapping space b. Alternatively, as shown in FIG. 3(a), the interference prevention member 6 can be positioned utilizing two protrusions 14d,14d, or utilizing the combination of the protrusion 14d and the recess 25d, as shown in FIG. 3(b).

ELEVENTH EMBODIMENT

FIG. 3(c) relates to one embodiment, showing a sectional view of the flexible tube 30b according to an eleventh embodiment. As shown in FIG. 3(c), the protectors 11,11, the outer blade 2 and the outer bellows 13 as in FIG. 3(a) are omitted, but in practice, the tube 30b has a similar structure to that shown in FIG. 3(a). In this eleventh embodiment, a buffering space S is provided between the outer bellows 2 and the inner bellows 14 (see FIG. 3(a)). An interference prevention member 16f is held in the overlapping space b where the inner bellows 14 and the auxiliary pipe 25 overlap each other. In the overlapping space b, the auxiliary pipe 25 having an inner spherical surface provided thereon and the inner bellows 14 are allowed to rotatably or slidably move relative to each other, with the interference prevention member 16f placed therebetween. The inner bellows 14 is separated into a plurality of pieces and has a spherical joint Fd and an outer spherical surface is provided on the interference prevention member 16f on the adjacent inner bellows. The outer spherical surface and the inner spherical surface pivotally support each other to provide a spherical joint Gd that can rotatably slide.

FIG. 3(e) shows a sectional view of the spherical joint Ge which is a modified embodiment of the spherical joint Gd shown in (c). The outer periphery of the auxiliary pipe 25 has no protrusions, and a ring-shaped or C-shaped interference prevention member 16f is inserted. An outer spherical surface is provided on the interference prevention member 16f. On the right end part of the inner bellows 14f, an inner spherical surface is provided, and the combination of spherical surfaces provides a spherical joint Gd.

In addition, in the overlapping space b where the inner bellows 14f and the auxiliary pipe 25 overlap each other, the interference prevention member 16f is held in such a manner that it is clamped therebetween. With this structure, the interference prevention member 16f will not be detached from the inner spherical surface of the inner bellows 14f. This configuration is in reversed relationship as compared to that of the spherical joint Gd in FIG. 2(c).

TWELFTH EMBODIMENT

Figure 3:
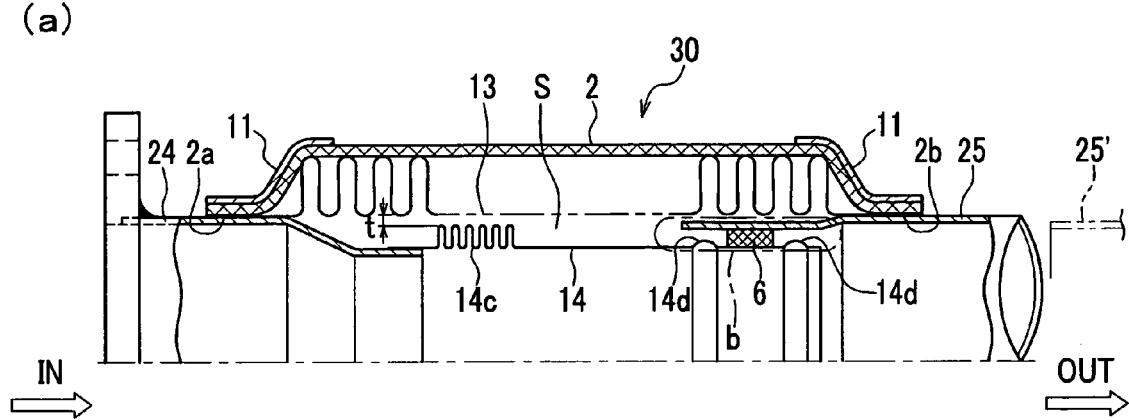
In FIG. 3, (a) shows a half sectional view of the flexible tube according to a ninth embodiment of the present invention. (b) shows a half sectional view of the flexible tube according to a tenth embodiment of the present invention. (c) shows a half sectional view of the flexible tube according to an eleventh embodiment of the present invention. (d) shows a sectional view of a modified embodiment of positioning of the interference prevention means shown in (a) and (b). (e) shows a sectional view of a modified embodiment of the spherical joint shown in (c).
Figure 3:
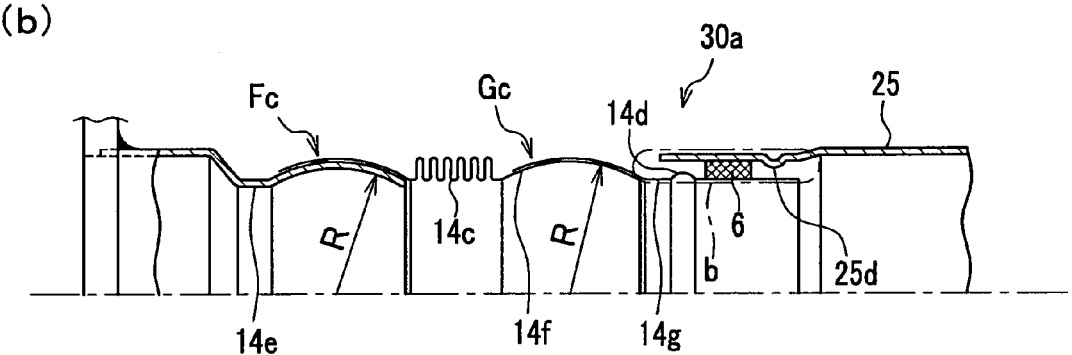
Figure 3:
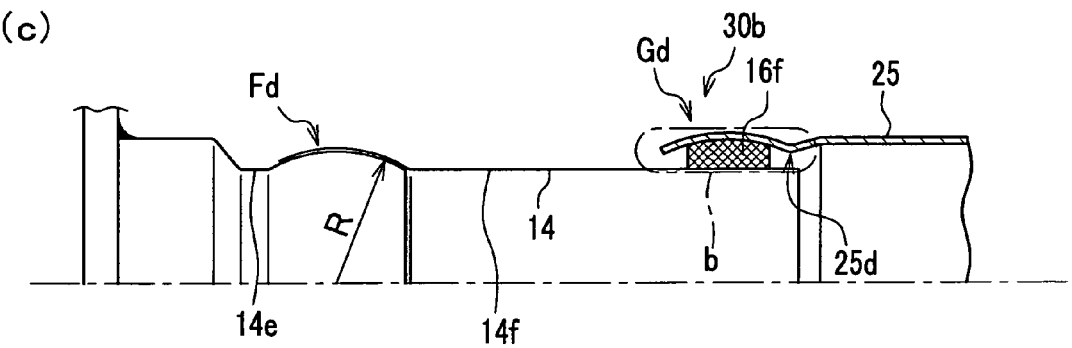
Figure 3:
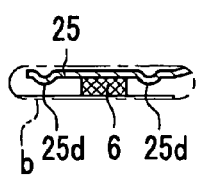
Figure 3:
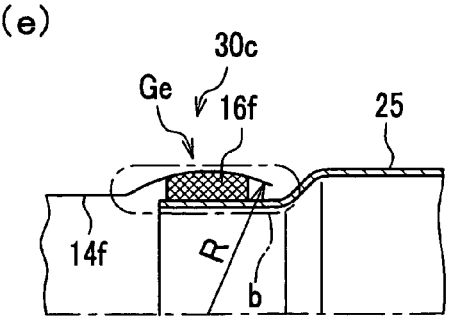
Figure 4:
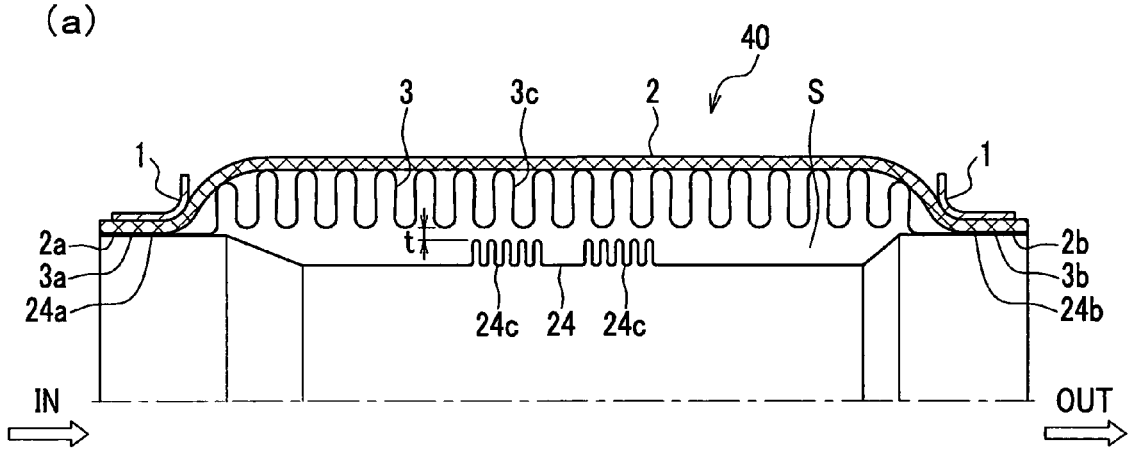
In FIG. 4, (a) shows a half sectional view of the flexible tube according to a twelfth embodiment of the present invention. (b) shows a half sectional view of the flexible tube according to a thirteenth embodiment of the present invention. (c) shows a half sectional view of the flexible tube according to a fourteenth embodiment of the present invention.
Figure 4:
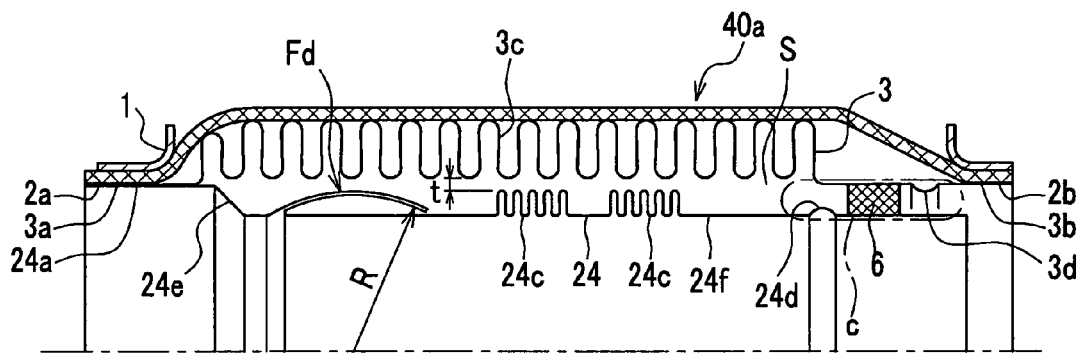
Figure 4:
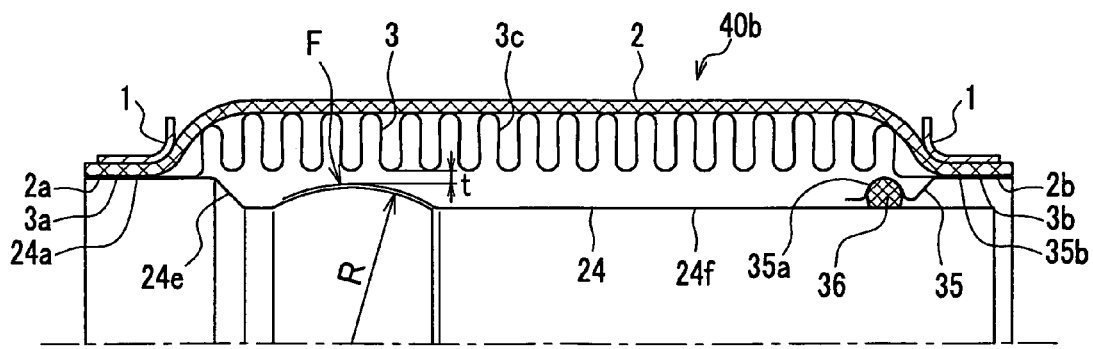

FIG. 4(a) shows a half sectional view of a flexible tube 40 according to an twelfth embodiment of the present invention. The flexible tube 40 shown in FIG. 4 will now be described only with respect to the differences from FIGS. 1-3. Those parts corresponding to the components of FIGS. 1-3 are identified with the same reference characters. As shown in FIG. 4, the flexible tube 40 includes protectors 1,1, an outer blade 2, an outer bellows 3 and an inner bellows 24.

This embodiment is different from FIG. 1 (the first embodiment) in that there is no auxiliary pipe and interference prevention member. The outer bellows 3 has pleats 3c provided thereon, and on the both end parts, cylindrical parts 3a and 3b are provided. The outer bellows 3 is fixed to the inner periphery of the protectors 1,1 with the outer blade 2 placed therebetween, by means of spot-welding or the like.

The inner bellows 24 is partially tapered from the cylindrical part 24a on the inlet IN (left side in the figure) toward the downstream to have a smaller diameter, while the inner bellows is partially tapered from the cylindrical part 24b on the outlet OUT (right side in the figure) toward the upstream to have a smaller diameter, creating the buffering space S with the gap t between the pleats bottoms of the outer bellows 3 and the pleats tops of the inner bellows 4. The inner bellows 24 has pleats 24c, 24c provided thereon. The inner bellows is fixed to the inner periphery of the protectors 1,1 via the outer blade 2 and the outer bellows 3. In this embodiment, the pleats 24c and the other pleats 24c have the same fold pitch and the same number of folds, however, they may have different fold pitch or may be combined into one bellows. The explanations for the operation and effect are the same as those given with respect to the first embodiment, and thus omitted.

THIRTEENTH EMBODIMENT

FIG. 4(b) shows a modified embodiment of the embodiment illustrated in FIG. 2(b), and shows a half sectional view of a flexible tube 40a according to a thirteenth embodiment of the present invention. The flexible tube 40a shown in FIG. 4 will now be described only with respect t the differences from FIGS. 1-3. Those parts corresponding to the components of FIGS. 1-3 are identified with the same reference characters. As shown in FIG. 4(b), this flexible tube 40a has an overlapping space c where the outer bellows 3 fixed to the exhaust gas outlet IN and the inner bellows 24 extending toward the exhaust gas outlet OUT overlap each other, and in the overlapping space C, the interference prevention member 6 is held.

The spherical joint Fd is formed of the inner spherical surface (female form) provided on the right end part of the inner bellows 24e and the outer spherical surface (male form) formed by folding up the left end part of the inner bellows 24f. The tube can take such a configuration. As shown above, by disposing the spherical joint Fd, durability against free bend, shear and the like is remarkably improved, leading to the flexible tube with prolonged life.

Further, FIG. 4(d) shows a modified embodiment of the spherical joint Fd shown in FIG. 4(b). As shown in FIG. 4(d), the outer spherical surface as a part of the spherical joint Fe may be formed of the inner bellows 24f, by turning down the left end part thereof Other components, which are the same as those illustrated in FIG. 1(a), are designated with the same reference characters, and thus a duplicate description is omitted.

FOURTEENTH EMBODIMENT

FIG. 4(c) relates to one embodiment, showing a half sectional view of a flexible tube 40b according to a fourteenth embodiment of the present invention. The flexible tube 40b shown in FIG. 4 will now be described only with respect to the differences from FIGS. 4(a) and 4(b). Those parts corresponding to the components of FIGS. 4(a) and (b) are identified with the same reference characters. As shown in FIG. 4(c), the interference prevention member 36 has a nearly circular cross section, and the inner periphery of the interference prevention member 36 is abutted by the outer periphery of the inner bellows 24f. In addition, the interference prevention member 36 is held in the groove of the recess 35a provided on the auxiliary pipe 35.

FIFTEENTH EMBODIMENT

Figure 5:
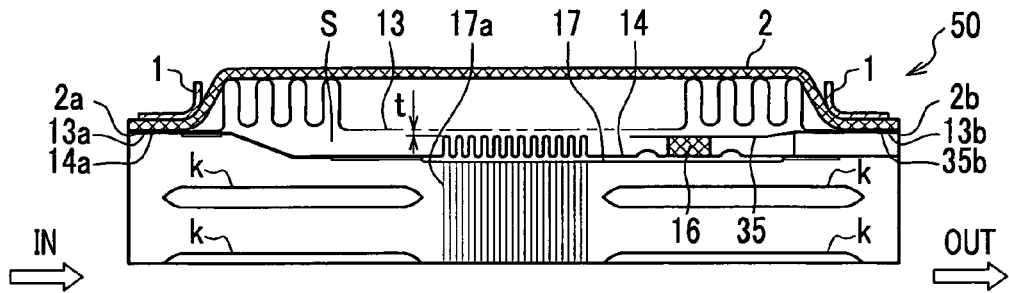
FIG. 5 shows a sectional view of a flexible tube according to a fifteenth embodiment of the present invention. (a) shows a half sectional plan view of the tube, (b) shows a partially sectional front view, (c) shows a left side view of (b), and (d) shows a modified embodiment of the flexible part d.
Figure 5:
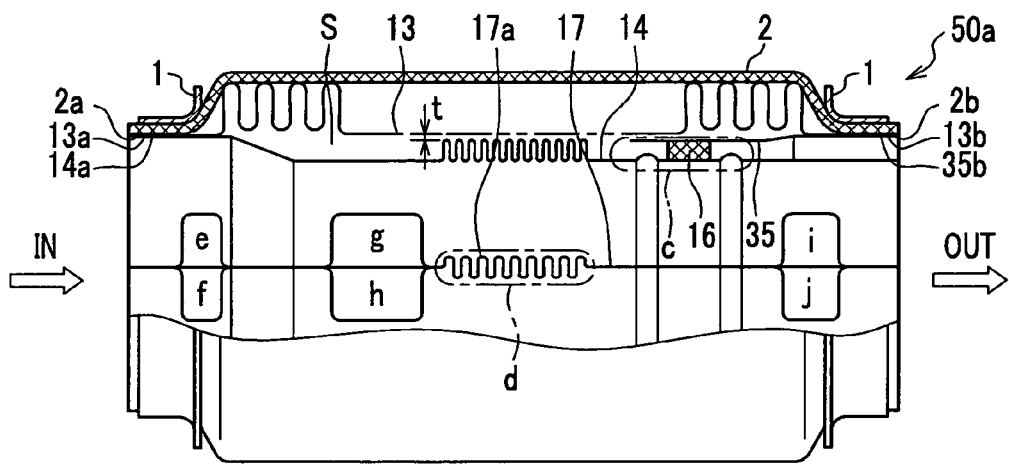
Figure 5:
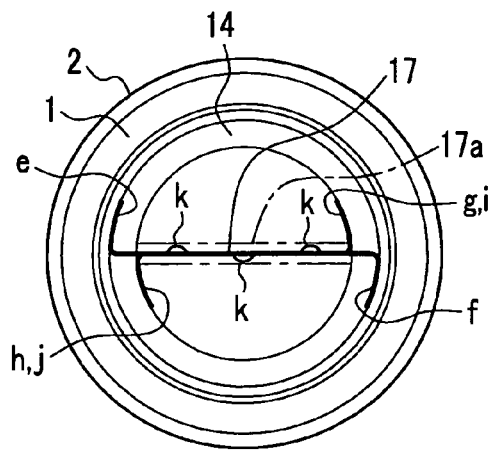
Figure 5:
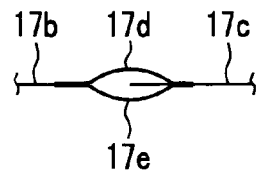

FIG. 5 relates to embodiments, and FIG. 5(a) shows a half sectional plan view of a flexible tube 50 according to a fifteenth embodiment, (b) shows a partially sectional front view, and (c) shows a left side view of (b). The flexible tube 50 shown in FIG. 5 will now be described only with respect to the differences from FIGS. 1 and 2. Those parts corresponding to the components of FIGS. 1 and 2 are identified with the same reference characters.

As shown in FIG. 5(a), the flexible tube 50 includes protectors 1,1, an outer blade 2, an outer bellows 13, an inner bellows 14, an auxiliary pipe 35, an interference prevention member 16 and a partition 17 that splits the exhaust path.

As shown in FIG. 5(c), it is preferred that the partition 17 be positioned in such a manner that it passes through the center of the inner bellows 14 and splits the cylindrical space defined by the inner bellows 14 into two semicylinders. The partition 17 is fixed to the inner periphery of the inner bellows 14 via adhesive surfaces e, f, g, h, i and j (see FIG. 5(b)) by means of spot-welding, adhesive and the like.

The partition 17 is in the form of plate as shown in FIG. 5(a), and has longitudinal protrusions k, k . . . on the both sides (3 in total, see FIG. 5(c)), thereby rendering the tube with strength in the axial direction, and providing a guide for exhaust gas flow.

With respect to the embodiment shown in FIG. 5(b), a flexible part d has a bellows 17a in the form of plate made of steel having spring property for allowing free displacement of the partition. The bellows 17a on the partition 17 is in the form of a plate and both end parts of the partition are attached to the inner periphery of the inner bellows 14. As a result, turbulence in the exhaust gas can be adjusted to laminar flow and the loss of the flow is reduced, leading to the improvement in the flow efficiency and in the output of the engine E. In other words, output performance can be increased.

FIG. 5(d) relates to one embodiment, showing a modified embodiment of the flexible part d of (b).

As shown in FIG. 5(d), the partition 17b is disposed on the inlet side, and the partition plate 17c is disposed on the outlet OUT side. The two steel plates 17d and 17e having spring property are fixed to the partition 17b in such a manner that the partition is clamped between end parts of the plates, and the partition plate 17c on the outlet OUT side is inserted between the steel plates 17d and 17e in such a manner that the partition plate 17c is clamped between the other end parts of the plates.

Each of the steel plates 17d and 17e has a shape similar to that obtained by longitudinally cutting an elliptic cylinder along the major axis into two. The steel plates 17d and 17e are disposed so that the appearance looks like a clam shell, and one end part of each of the plates 17d and 17e is spot-welded to the partition 17b, while the opposite end parts of the plates 17d and 17e hold the partition 17c in such a manner that the partition 17c is clamped between the plates 17d and 17e. Therefore, when flexure is necessary, they flexibly sag, and when the vibration is transmitted to this area, the partition plate 17c slides vertically or horizontally. As a result, vibrational energy is converted into frictional heat, and the vibration is reduced. For this reason, an expensive bellows is not necessary, and an inexpensive flexible part can be introduced instead.

Now, the operation and effect of the fifteenth embodiment is explained in reference to FIG. 5.

As shown in FIGS. 8(a) and (b), a left end of the flexible tube 50 is connected to the exhaust manifold M1, and a right end thereof is connected to the catalytic converter C. Referring to FIG. 5, the inner bellows 14 and the auxiliary pipe 35 provides an overlapping space c in such a manner that the buffering space S is secured with the gap t between the inner tube of the outer bellows 13 and the inner bellows 14.

In addition, as shown in FIG. 5(c), a partition 17 is disposed on the centerline, and the partition 17 splits the cylindrical space defined by the inner bellows 14 into two semicylinders, and further, the protrusions k, k . . . on the both sides (3 in total) provided on the partition 17, thereby rendering the tube with rigidity, and providing a guide for exhaust gas flow.

The exhaust gas from the cylinders of the engine E is collected through the exhaust manifold M1 as one flux, and passes through the inner tube of the flexible tube 40. Because of the double structure configured by the outer bellows 13 and the inner bellows 14 with the auxiliary pipe 35, sound insulation effect is obtained. In addition, the heat of the exhaust gas is maintained, and thus the lowering of the temperature is suppressed, leading to quick temperature rise of the exhaust gas to be fed into the catalytic converter, thereby promoting the activation of the catalysts and the purification of the exhaust gas components. Further, the presence of the interference prevention member 16 prevents the outer bellows 13 and the inner bellows 14 from interfering with each other, and due to the rotatable or slidable movement of the interference prevention member 16, kinetic energy due to the vibration or noise is converted into inertial energy and frictional heat, and consumed as frictional heat, leading to attenuation of the vibration and noise.

In addition, the exhaust path of the inner bellows 14 is split into two with the partition 17, and therefore, the turbulence in the exhaust gas can be adjusted to laminar flow, before they are fed into the catalytic converter C.

SIXTEENTH EMBODIMENT

Figure 6:
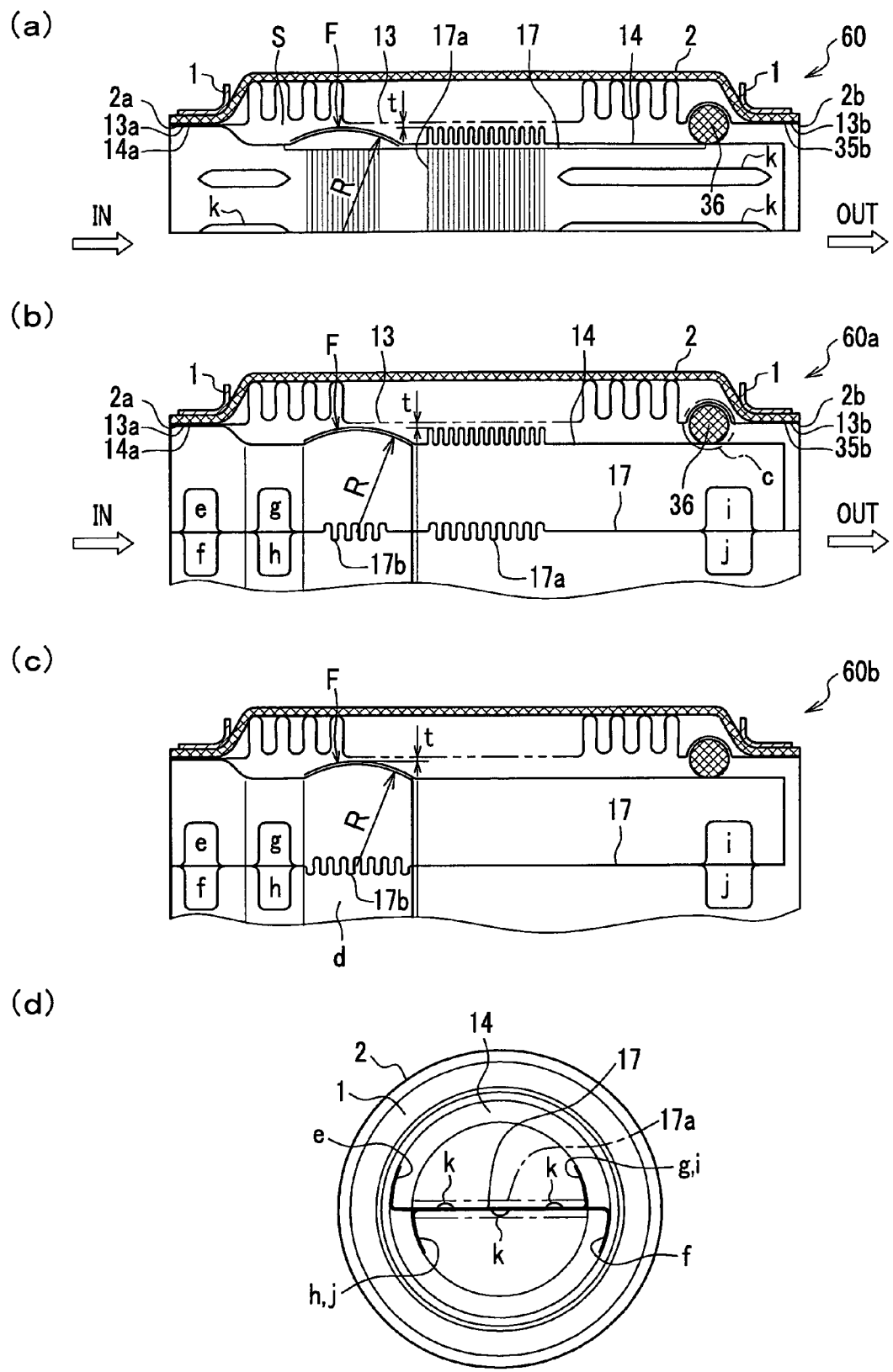
In FIG. 6, (a) shows a half sectional plan view of the flexible tube according to a sixteenth embodiment of the present invention, (b) shows a partially sectional front view, (c) shows a modified embodiment of (b) (d) shows a left side view of (b).

FIG. 6 relates to embodiments, and FIG. 6(a) shows a half sectional plan view of a flexible tube 60 according to a sixteenth embodiment of the present invention, (b) shows a partially sectional front view, and (d) shows a left side view of (b). The flexible tube 60 shown in FIG. 6 will now be described only with respect to the differences from FIG. 5. Those parts corresponding to the components of FIG. 5 are identified with the same reference characters.

As shown in FIGS. 6(a) and (b), the flexible tube 60 does not have auxiliary pipe 35, and includes an inner bellows 14, an interference prevention member 36 and a partition 17 that splits the exhaust path. On the inner bellows 14, a spherical joint F is provided.

As shown in FIG. 6(b), an overlapping space c where the outer bellows 13 fixed to the exhaust gas inlet and the exhaust gas outlet and the inner bellows 14 extending toward the exhaust gas outlet OUT overlap each other is provided, and the inner periphery of the outer bellows 13 has a recess to hold an interference prevention member 36. In addition, the partition 17 has bellows 17a, as well as bellows 17b.

FIG. 6(c) shows a modified embodiment of the partition 17 in FIG. 6(b). As shown in FIG. 6(c), the partition 17 of the flexible tube 60b does not have bellows 17a, and inside of the spherical joint F, bellows 17b is provided. As a result, turbulence in the exhaust gas is adjusted to laminar flow and the loss of the flow is reduced, leading to the improvement in the flow efficiency and in the output of the engine E.

SEVENTEENTH EMBODIMENT

Figure 7:
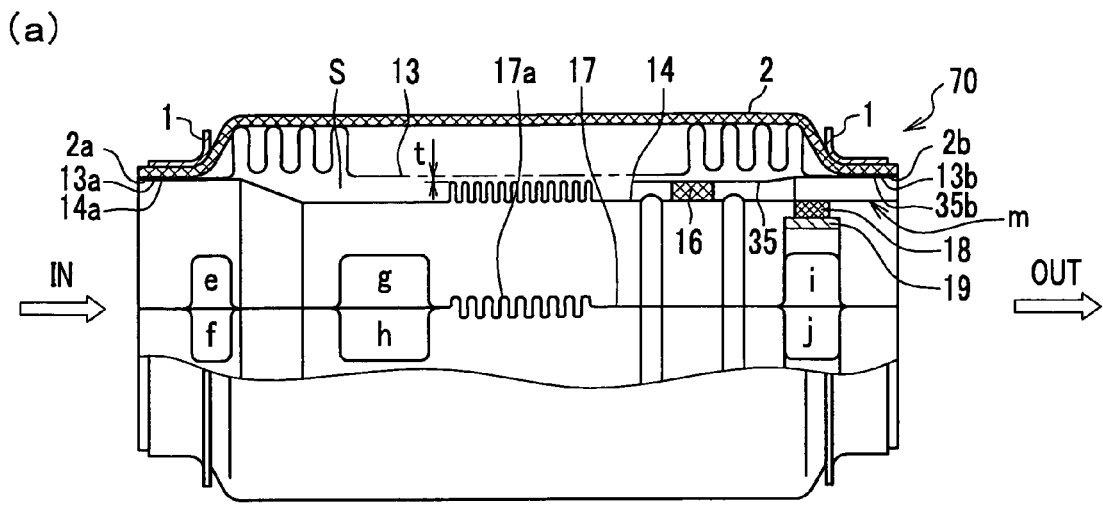
In FIG. 7, (a) shows a partially sectional front view of the modified flexible tube according to a seventeenth embodiment of the present invention, (b) shows a left side view of (a), (c) shows a right side view of (a), and (d) shows a modified embodiment of (a).
Figure 7:
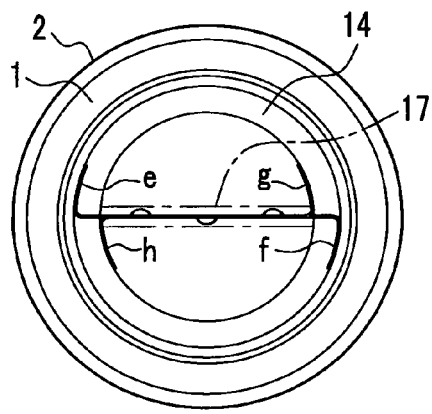
Figure 7:
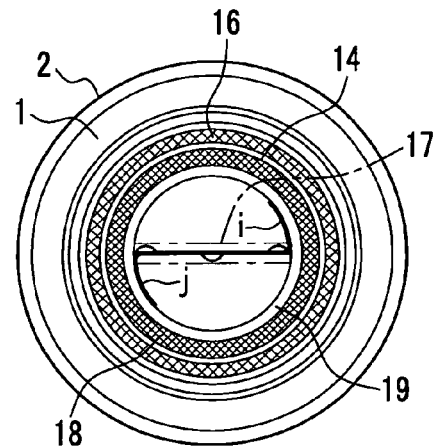
Figure 7:
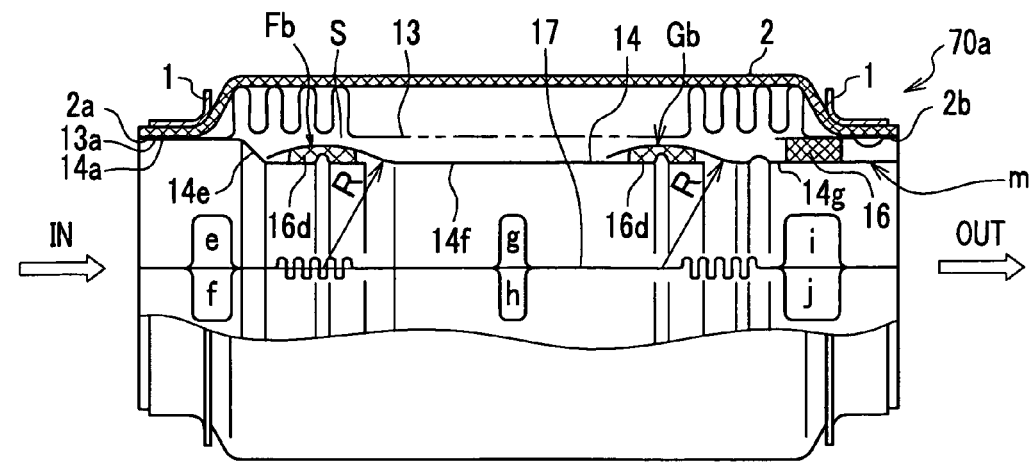

FIG. 7(a) shows a partially sectional front view of the flexible tube 70 according to a modified embodiment of the seventeenth embodiment of the present invention, (b) shows a left side view of (a), (c) shows a right side view of (a). The flexible tube 70 shown in FIG. 7 will now be described only with respect to the differences from FIG. 6. Those parts corresponding to the components of FIG. 6 are identified with the same reference characters. As shown in FIG. 7(a), an interference prevention member 18 and a ring 19 are added. The ring 19 is fixed to the adhesive surfaces i and j of the partition 17 by means of, for example, spot-welding, and the interference prevention member 18 is fixed to the ring 19 by means of spot-welding. As a result, the interference prevention member 18 and the ring 19 can slide freely in the directions of the axis, on the inner periphery m of the inner bellows 14 and on the outer periphery of the interference prevention member 18, leading to absorption of the difference in axial size between the inner bellows 14 and the partition 17 caused by thermal expansion. Moreover, the generation of stress between the inner bellows 14 and the partition 17 can be suppressed.

Here, the procedure to assemble the interference prevention member 18 and the ring 19 shown in FIG. 7(a) is explained.

1. The ring 19 is spot-welded to the adhesive surfaces i and j of the partition 17.
2. The interference prevention member 18 is spot-welded to the ring 19.
3. In the inner bellows 14, the partition 17 is disposed.
4. The inner bellows 14 is spot-welded to the adhesive surfaces e, f, g and h of the partition 17.

By following such a procedure, the inner bellows 14 and the interference prevention member 18 can be assembled together without fixing them to each other, and as a result, the partition 17 becomes stretchable at the bellows 17a.

FIG. 7(d) shows a modified embodiment of (a). As shown in FIG. 7(d), a flexible tube 70a is similar to the flexible tube 20c of the eighth embodiment shown in FIG. 2(d), and thus brief explanation is made here. As shown in FIG. 7(d), the inner bellows 14 is separated into three pieces, 14e, 14f and 14g. On the inner bellows 14, a spherical joint Fb and another spherical joint Gb are provided, and the interference prevention members 16d are held.

With this combination, two bellows are provided inside the spherical joints Fb and Gb of the inner bellows 14, which will resolve the difference in expansion/contraction degree between the inner bellows 14 and the partition 17.

It is apparent that various modification, alteration, combination can be made within the scope of the technical idea in this field. For example, the partition 17 disposed in the flexible tube may split the inner periphery of the inner bellows 14 into right and left, or may split it into 3, 4 or more. Two or more spherical joint may be provided. In addition, the combinations of the components in the exhaust system A (see FIG. 8(a)) are not limited to those shown in FIGS. 8(a), (b) and (c). Further, heat insulator and the like may be attached or applied to the inner periphery and/or the outer periphery of the outer bellows, for suppressing thermal conduction, vibration transmission and the like. Alternatively, other combinations may be possible.

INDUSTRIAL APPLICABILITY

According to the flexible tube of the present invention, by providing a gap as a buffering space between the pleats bottoms of the outer bellows and the pleats tops of the inner bellows, the amounts of exhaust sound and heat released from the inner bellows are suppressed, thus durability of the outer bellows is improved, and the amounts of exhaust sound and heat released from the outer bellows can be reduced. In addition, in the case of the tube disposed upstream of the catalytic converter, the lowering of the temperature of the exhaust gas to be fed into the catalytic converter is suppressed, leading to quick temperature rise of the exhaust gas to be fed into the catalytic converter, thus resulting in improved capability to purify exhaust gas.

The invention claimed is:

1. A flexible tube to be disposed on an exhaust path for exhaust gas from an engine, the tube comprising:
    an outer bellows that is an outer tube having a flexible part with bellows,
    an inner bellows that is an inner rube having a flexible part, a gap as a buffering space being provided between the outer bellows and the inner bellows, the inner bellows being fixed to an exhaust gas inlet of the outer bellows and extending toward an exhaust gas outlet thereof,
    an auxiliary pipe, an overlapping space being provided where the inner bellows and the auxiliary pipe overlap each other, the auxiliary pipe being fixed to the exhaust gas outlet of the outer bellows and extending toward the exhaust gas inlet; and
    an interference prevention member held in the overlapping space.

2. The flexible tube according to claim 1, further comprising a plurality of protrusions formed in the overlapping space for positioning the interference prevention member and determining a longitudinal position thereof.

3. The flexible tube according to claim 1, wherein the interference prevention member is made of mesh wire.

4. A flexible tube to be disposed on an exhaust path for exhaust gas from an engine, the tube comprising an outer bellows that is an outer tube having a flexible part with bellows, an inner bellows that is an inner tube having a flexible part, the inner tube being fixed to one open end part of the outer bellows, in which a gap as a buffering space is provided between the outer bellows and the inner bellows; and an interference prevention member,
    wherein an overlapping space is provided where the outer bellows and the inner bellows overlap each other, the outer bellows being fixed to an outlet of the exhaust gas from the engine and the inner bellows extending toward an exhaust gas outlet; and the interference prevention member is held in the overlapping space.

5. The flexible tube according to claim 4, wherein the interference prevention member held in the overlapping space has a nearly circular cross section.

6. A flexible tube to be disposed on an exhaust path for exhaust gas from an engine, the tube comprising:
    an outer bellows that is an outer tube having a flexible part with bellows,
    an inner bellows that is an inner tube having a flexible part, a gap as a buffering space being provided between the outer bellows and the inner bellows, the inner bellows being fixed to the exhaust gas inlet of the outer bellows and extending toward the exhaust gas outlet;
    an auxiliary pipe, an overlapping space being provided where the inner bellows and the auxiliary pipe overlap each other, the auxiliary pipe being fixed to the outlet of the outer bellows and extending toward the inlet,
    wherein the inner bellows and the auxiliary pipe in the overlapping space are disposed with a gap therebetween that allows them to slidably move relative to each other.

7. The flexible tube according to claim 1, further comprising an interference prevention member, wherein the overlapping space is rotatably and slidably configured to have the interference prevention member provided between the auxiliary pipe and an outer periphery of the inner bellows, in such a manner that pennits the interference prevention member to slide in axial directions; and wherein the interference prevention member comprises an outer spherical surface having a radius R with a center thereof aligned on an axis of the inner bellows, and the outer spherical surface overlaps and rotatably engages with an inner spherical surface provided in the auxiliary pipe, the inner spherical surface having a radius R with a center thereof aligned on the axis of the inner bellows.

8. The flexible tube according to claim 1, wherein the inner bellows is separated into a plurality of pieces; on one end part of each piece, an outer spherical surface is provided so as to have a radius R with a center thereof aligned on an axis of the inner bellows; on the other end part of the adjacent inner bellows piece, an inner spherical surface is provided so as to have a radius R with a center thereof aligned on an axis of the inner bellows; and the outer spherical surface and inner spherical surface pivotally support each other to provide a spherical joint that can rotatably slide.

9. The flexible tube according to claim 1, wherein the inner bellows is separated into a plurality of pieces; a ring-shaped interference prevention member is held on the outer periphery of one end part of each the inner bellows piece; on the outer periphery of the interference prevention member, an outer spherical surface is provided so as to have a radius R with a center thereof aligned on an axis of the inner bellows; on the other end part of the adjacent inner bellows piece, an inner spherical surface is provided so as to have a radius R with a center thereof aligned on an axis of the inner bellows; and the outer spherical surface of the interference preventing member and the inner spherical surface of the inner bellows piece pivotally support each other to provide a spherical joint that can rotatably slide.

10. The flexible tube according to claim 9, wherein a plurality of the spherical joints is provided on the inner bellows.

11. The flexible tube according to claim 8, wherein a plurality of the spherical joints is provided on the inner bellows.

12. The flexible tube according to claim 6, further comprising a partition that splits the exhaust path En a direction from the exhaust gas inlet to the exhaust gas outlet.

13. The flexible tube according to claim 12, wherein the partition has adhesive surfaces for attaching to the inner periphery of the inner bellows, and has a flexible part for allowing the partition to freely displace.

14. The flexible tube according to claim 13, wherein the flexible part for allowing the partition to freely displace comprises bellows in the form of a steel plate having a spring property.

15. The flexible tube according to claim 13, wherein the flexible part for allowing the partition to freely displace includes a plurality of steel plates having spring property, one end part thereof being fixed to the partition on the inlet side in such a manner that the partition is clamped by the steel plates, and the other end pans thereof holding the partition on the outlet side in such a manner that the partition is clamped by the steel plates.

16. The flexible tube according to claim 2, wherein a distance between the protrusions on two sides of the interference prevention member is set larger than a width of the interference prevention member in an axial direction, so as to allow the interference prevention member to slide in the axial direction and to rotate about an axis thereof.

17. The flexible tube according to claim 1, wherein the overlapping space is rotatably and slidably configured to have the interference prevention member provided between the inner bellows and an outer periphery of the auxiliary pipe, in such a manner that permits the interference prevention member to slide in axial directions; and wherein the interference prevention member comprises an outer spherical surface having a radius R with a center thereof aligned on an axis of the inner bellows, and the outer spherical surface overlaps and rotatably engages with an inner spherical surface provided in the auxiliary pipe, the inner spherical surface having a radius R with a center thereof aligned on the axis of the inner bellows.

18. The flexible tube according to claim 4, wherein the inner bellows is separated into a plurality of pieces; on one end part of each piece, an outer spherical surface is provided so as to have a radius R with a center thereof aligned on an axis of the inner bellows; on the other end part of the adjacent inner bellows piece, an inner spherical surface is provided so as to have a radius R with a center thereof aligned on an axis of the inner bellows; and the outer spherical surface and inner spherical surface pivotally support each other to provide a spherical joint that can rotatably slide.

19. The flexible tube according to claim 6, wherein the inner bellows is separated into a plurality of pieces; on one end part of each piece, an outer spherical surface is provided so as to have a radius R with a center thereof aligned on an axis of the inner bellows; on the other end part of the adjacent inner bellows piece, an inner spherical surface is provided so as to have a radius R with a center thereof aligned on an axis of the inner bellows; and the outer spherical surface and inner spherical surface pivotally support each other to provide a spherical joint that can rotatably slide.

20. The flexible tube according to claim 4, wherein the inner bellows is separated into a plurality of pieces; a ring-shaped interference prevention member is held on the outer periphery of one end part of each the inner bellows piece; on the outer periphery of the interference prevention member, an outer spherical surface is provided so as to have a radius R with a center thereof aligned on an axis of the inner bellows; on the other end part of the adjacent inner bellows piece, an inner spherical surface is provided so as to have a radius R with a center thereof aligned on an axis of the inner bellows; and the outer spherical surface of the interference preventing member and the inner spherical surface of the inner bellows piece pivotally support each other to provide a spherical joint that can rotatably slide.

21. The flexible tube according to claim 6, wherein the inner bellows is separated into a plurality of pieces; a ring-shaped interference prevention member is held on the outer periphery of one end pan of each the inner bellows piece; on the outer periphery of the interference prevention member, an outer spherical surface is provided so as to have a radius R with a center thereof aligned on an axis of the inner bellows; on the other end part of the adjacent inner bellows piece, an inner spherical surface is provided so as to have a radius R with a center thereof aligned on an axis of the inner bellows; and the outer spherical surface of the interference preventing member and the inner spherical surface of the inner bellows piece pivotally support each other to provide a spherical joint that can rotatably slide.

22. The flexible tube according to claim 4, further comprising a partition that splits the exhaust path in a direction from the exhaust gas inlet to the exhaust gas outlet.

23. The flexible tube according to claim 1, further comprising a partition that splits the exhaust path in a direction from the exhaust gas inlet to the exhaust gas outlet.

24. The flexible tube according to claim 7, wherein the inner bellows is separated into a plurality of pieces; on one end part of each piece, an outer spherical surface is provided so as to have a radius R with a center thereof aligned on an axis of the inner bellows; on the other end part of the adjacent inner bellows piece, an inner spherical surface is provided so as to have a radius R with a center thereof aligned on the axis of the inner bellows; and the outer spherical surface and inner spherical surface pivotally support each other to provide a spherical joint that can rotably slide.

25. The flexible tube according to claim 19, wherein a plurality of the spherical joints is provided on the inner bellows.

* * * * *